Jan. 29, 1957  W. A. THOMAS  2,779,831
MULTIPOLE ELECTRIC CIRCUIT BREAKERS
Filed June 14, 1954  4 Sheets-Sheet 1
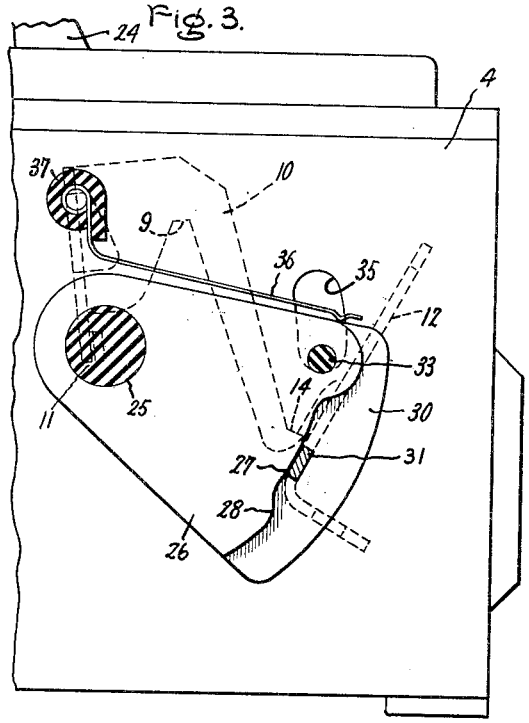
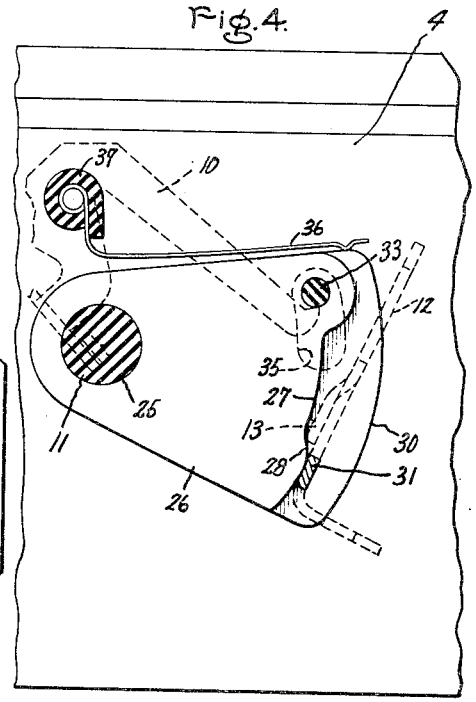
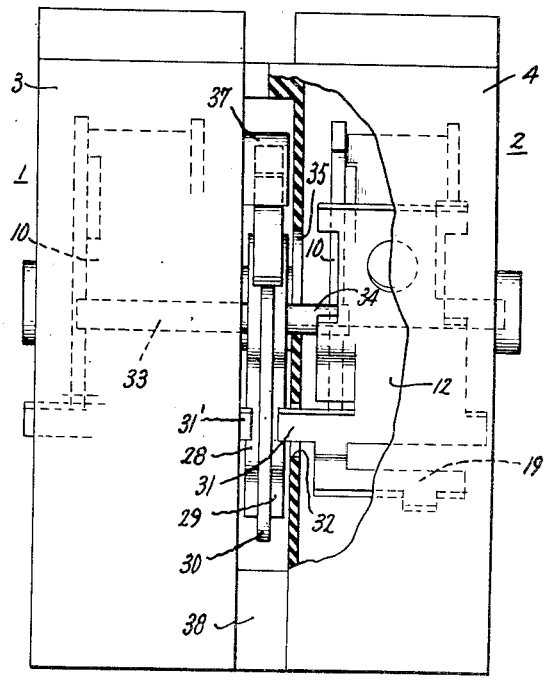
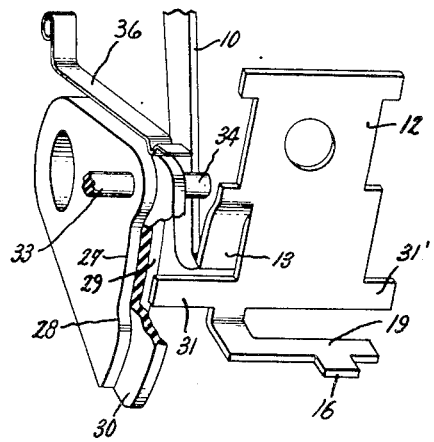
Inventor:
William A. Thomas,
by Richard R. Brainard
His Attorney.

Jan. 29, 1957 W. A. THOMAS 2,779,831
MULTIPOLE ELECTRIC CIRCUIT BREAKERS
Filed June 14, 1954 4 Sheets-Sheet 2

Inventor:
William A. Thomas,
by Richard R. Brainard
His Attorney.

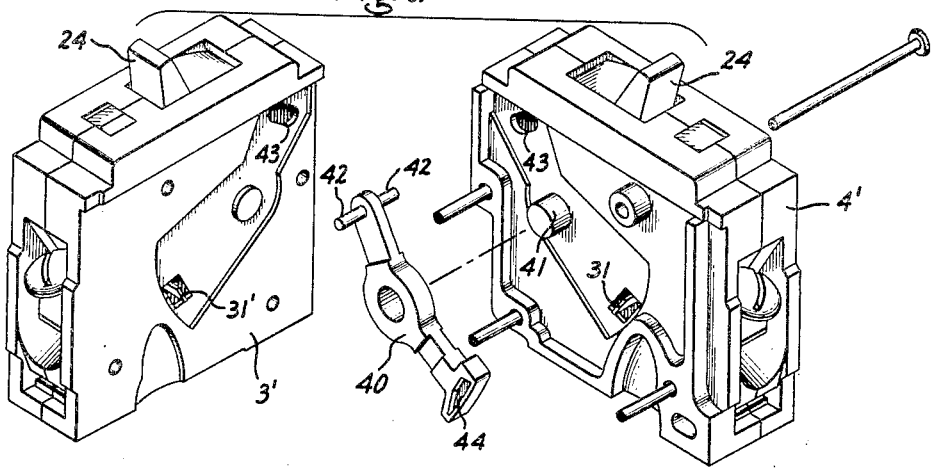
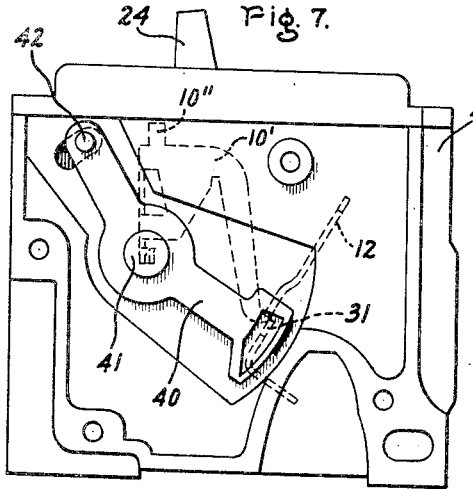
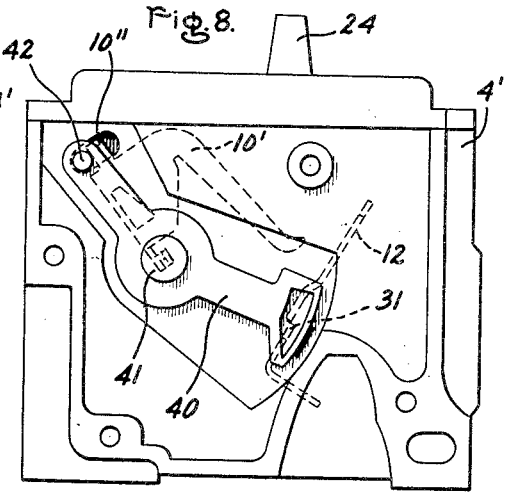
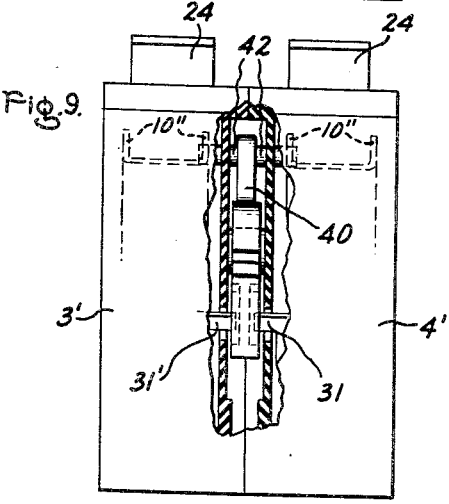

Inventor:
William A. Thomas,
by Richard R. Brainard
His Attorney.

United States Patent Office 2,779,831
Patented Jan. 29, 1957

2,779,831

MULTIPOLE ELECTRIC CIRCUIT BREAKERS

William Andrew Thomas, Plainville, Conn., assignor to General Electric Company, a corporation of New York Application June 14, 1954, Serial No. 436,291

11 Claims. (Cl. 200—50)

The present invention relates to improved multipole electric circuit breakers of the type automatically operable in response to an overload current and more particularly to an improved tripping interlock for breakers of this type which insures tripping of all poles of the breakers in response to automatic tripping of any one pole.

Electric circuit breakers of the type which may be manually operated to open and closed positions by means of a snap acting mechanism and which are automatically tripped in response to an overload condition in the circuit controlled by the breaker are in wide-spread use. A breaker of this general type is described in detail and claimed in detail in Thomas Patent 2,627,563, dated February 3, 1953, and assigned to the assignee of this invention. In the type of breaker there illustrated, a tripping member is releasably restrained by an overload actuated latching member. The tripping member is biased by the spring of the snap acting mechanism to move to a position permitting circuit opening operation of the breaker by the snap acting mechanism independently of the position of the manual operating member.

In multipole breakers of the above type, it may be desirable to provide means for insuring tripping of all poles in response to automatic tripping of any one of the poles. A number of prior art devices provide for such operation but they are on the whole somewhat complicated and not readily adaptable, for example, to breakers of the type shown in the above-identified patent.

The present invention has for an important object the provision of an improved interlock for multipole breakers for effecting tripping of all poles in response to automatic tripping of any one pole and which at the same time requires a minimum of special parts as compared with the number of standard single pole breakers employed in assembly.

Another object of my invention is to provide trip-interlocking means suitable for use with such multipole circuit breakers wherein each pole of the assembly has its own enclosure substantially completely enclosing it independently of the housings of adjacent poles, whereby the danger of electrical flash-over from one such pole to another is minimized.

Another object of my invention is to provide trip-interlocking means for two substantially completely individually enclosed circuit breakers, which interlocking means is substantially entirely outside the main chamber of said individual enclosures but is nevertheless protected and shielded from dirt and from interference by foreign objects.

Further objects and advantages of my invention will become apparent as the following description proceeds, reference being had to the accompanying drawings, and its scope will be pointed out in the appened claims. In the drawings:

Figure 1 is an end elevational view partially broken away showing my invention applied to a two pole breaker assembly;

Figure 2 is a perspective view showing the details of construction of the interlocking parts of the breaker assembly of Figure 1;

Figure 3 is a side elevational view showing the interlocking parts with the breaker in the closed circuit position;

Figure 4 is an elevational view showing the same parts with the breaker in tripped position;

Figure 6 is an exploded view in perspective showing a two-pole breaker embodying a modification of my invention.

Figure 7 is an elevational view showing one breaker in closed position with the interlocking mechanism visible;

Figure 8 shows the breaker of Figure 7 in tripped position;

Figure 9 is an end elevational view partially broken away showing a two pole breaker assembly.

Figure 5:
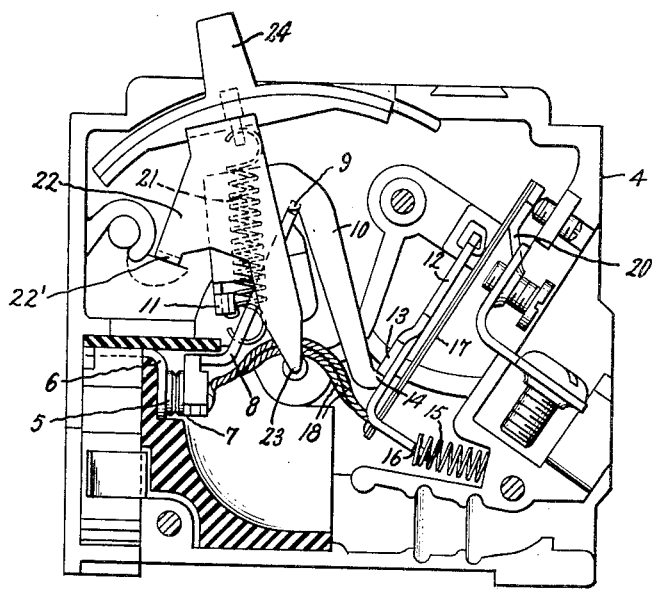
Figure 5 is an elevational view of a circuit breaker to which my invention may be applied, the cover being removed to show the mechanism.

Referring now to the drawings, I have shown my invention embodied in a two pole breaker made up of two substantially identical single pole circuit breakers 1 and 2 secured in side-by-side relation by suitable bolts (not shown) extending through the insulating casings 3 and 4. The individual breakers illustrated in connection with my invention are the type shown in the above-identified Thomas patent and may be of identical construction except for the modifications in the casings for accommodating the parts of the interlocking mechanism and the modification of the latching member made for the purpose of cooperation with the interlocking mechanism. Since each breaker 1 and 2 is complete in itself and is of substantially the same construction the description, to the extent that it applies to both breakers, will not be duplicated and the same reference numerals will be applied to corresponding parts.

The operating mechanism of the individual breakers 1 and 2 is best shown in Figure 5. As there illustrated, the parts are received and positioned in suitable recesses formed in the insulating casing 4 and include stationary contact 5 supported by the terminal 6 and a movable contact 7 supported by contact arm 8 which is pivoted on a releasable cradle or tripping member 10. The cradle 10 is pivoted in the casing at 11 and retained in the position shown in Figure 5 (the closed position of the breaker) by a pivoted latch 12 having a latching tip 13 engaging the end 14 of the cradle 10. The latch 12 is biased toward the position shown in Figure 5 by a compression spring 15 positioned between the casing 4 and a lug 16 on the latch. The latch is adapted to be moved in a counterclockwise direction to release the cradle 10 in response to an overload condition through the contacts 5 and 7 by a bimetallic element 17 connected in circuit with the contacts 5 and 7 by flexible conductors 18. Bimetallic element 17 engages an integral arm 19 (Figure 2) on the latch member 12 and is supported at the opposite end from a conducting terminal and support member 20 to which it is welded.

The cradle 10 is biased to move in a counterclockwise direction by the snap acting mechanism of the breaker which includes an over center spring 21 connected at one end to the movable contact arm 8 and at the other end to operating member 22 pivoted in the casing 4 at 23. An operating handle 24 extending from the casing operatively engages the member 22. It is seen from the drawing that as the operating handle is moved to the right it carries with it the upper end of the overcenter spring until the line of action crosses the pivot point 9 at which time the movable contact arm moves to the right with a snap action.

With the breaker parts in the position shown in Figure 5, the movable contact 7 and arm 8 may move to an open position in response to release of the cradle member 10 upon the occurrence of an overload through the contacts. Upon the occurrence of such an overload, the lower end of the bimetallic element 17 moves to the right carrying with it the latch member 12 to release the cradle 10. Cradle 10 rotates about the pivot 11 under the bias of the operating spring 21 until the pivot point passes through the line of action of the spring on the movable contact arm at which time the contact moves to the open position with a snap action. As described in the aforementioned Thomas Patent 2,627,563, and as will be readily understood, the breaker mechanism is reset after the above-described tripping action by rotating the cradle member 10 in a clockwise direction until the end 14 of the cradle engages the latch tip 13. This movement of the cradle is accomplished by moving the operating handle to the right so that the lug 22' of the handle support 22 engages the cradle 10 and moves it in a clockwise direction.

A construction embodying the present invention for insuring the tripping of either of the breakers 1 and 2 in response to automatic tripping of the other breaker will now be described. The casing 4 of the breaker 2 is provided on one side thereof with an integral hub 25 which supports a segment shaped cam member 26 for pivotal movement. The cam member is preferably formed of insulating material and is provided near its free end with a cam surface 27 including lift portion 28. An identical cam surface 29 is provided on the opposite side of the segment shaped cam and is separated from the first cam surface by the extension of the cam 30 of reduced thickness. As illustrated, the latch member 12 is provided with an integral transverse extension 31 which extends through an opening 32 provided in the switch housing and acts as a cam follower on the cam surface 29. As the cam is rotated in a counterclockwise position from that shown in Figure 3 the extension 31 of the latch member 12 rides up the cam lift and trips the breaker. A similar integral extension 31' on the opposite edge of the latch member is provided for the breaker 1 and may be provided on all of the breakers although it is not required for the last breaker to the right as viewed in Figure 1. Likewise, the extension 31 is not required for the last breaker to the left as viewed in Figure 1.

In order to actuate the cam member in the manner just described in response to tripping of either of the breakers, integral extensions in the form of rods 33 and 34 extend from the opposite faces thereof and through suitable openings 35 provided in the switch casings. The rods 33 and 34 extend into the path of movement of the tripping arm of cradle 10 as it moves from its latched position of Figure 3 to the tripped position of Figure 4 in each of the breakers, the opening 35 being of sufficient size to permit substantial movement of the cam 26. The cam is biased to the position shown in Figure 3 by means of a leaf spring 36 which may, to advantage, be non-rotatably retained in a slotted hub 37 formed integrally with the side wall of the switch casing.

As shown in Figure 1, the tripping arm of cradle 10 of the breakers 1 and 2 both lie along the left hand wall of the casing as shown in that figure. It is, therefore, necessary that the operating rod 33 be of sufficient length to extend across the switch casing to engage the tripping arm of the cradle 10. As illustrated in the drawing, the switch casing 3 is provided with a marginal upstanding flange 38 which cooperates with the adjacent side wall of the switch casing 3 to form an enclosure for the interlocking mechanism. While it is possible that each breaker be of identical construction, it is apparent that the openings 32 and 35 as well as the hubs 25 and 37 of the casing are not required on the outside of the outer breakers. It is also apparent that the extension 31 on the latching member is not required for the breaker at the left-hand end of the assembly as viewed in Figure 1 and that the corresponding extension 31' on the opposite edge of the latch 12 is not required for the right-hand breaker as viewed in Figure 1.

It is apparent from the foregoing detailed description that the present invention may be applied to a breaker made up of any number of single pole units arranged in side-by-side relation as illustrated and that tripping of any one of the breakers in response to an overload effects rotation of the cam member 26 through the movement of the cradle 10 and its engagement with one of the extensions 33 or 34 on the cam. It is understood that the cradle is released in response to an overload through contacts 5 and 6 by movement of bimetallic element 17 and the resultant movement of latch 12 in a counterclockwise direction (see Figure 5). This movement of the cam brings lift portion 28 of the cam surfaces into engagement with the extensions 31 and 31' on the latch members of the breakers to effect tripping of the other breaker. If more than two breakers are employed, the tripping of the second breaker initiates a similar action through the interlocking member housed between it and the next adjacent breaker. It is apparent that this present invention provides for this type of operation with a minimum of departure from a side-by-side assembly of standard single pole breakers. Accordingly, the operation is provided at a minimum of additional expense.

Since the interlocking is put into action by movement of the cradle member which only moves as the result of automatic activation of the breaker it is apparent that the breakers are manually operable on an independent basis although the breakers are frequently ganged for simultaneous manual operation by means of a handle tie.

In Figures 6–9, inclusive, is shown another modification of my invention applied to the same type of circuit breaker as that described in connection with Figures 1–5, inclusive. Where there is no essential difference in the construction of the parts the same reference numerals have been applied to corresponding parts. Where the construction of the parts has been modified the designating numerals have been primed or new numerals used. Referring now to Figures 6–9 the breakers 3' and 4' each include operating mechanisms as shown in Figure 5 with the exception that the cradle member 10' is provided at the upper edges thereof with projections 10''. As illustrated, an interlocking or cam member 40 is pivoted on a molded hub 41 on the side wall of breaker 4'. At one end thereof the cam members is provided with lateral extending projections 42 which extend into openings 43 in the casings of the breakers 3' and 4' and into the path movement of the projections 10'' of the cradles 10' when the cradles move in response to the tripping action of the breakers. At the opposite end the cam member is provided with recesses 44 on the opposite sides thereof for receiving the ends of the extensions 31 and 31' of the latch members 12 of the two breakers. As illustrated, the inner side walls of the recesses are shaped to provide cam surfaces which, as will become more apparent in the following description of the operation of the breakers, trips either one of the breakers in response to overload tripping of the other of the breakers. As shown in Figure 7 the breaker is in closed circuit position and as is clear from an inspection of Figure 9 the ends 31 and 31' of the extensions on both members 12 extend into recesses 44 of the cam member. When the breaker is tripped and the cradle 10' released, the cradle moves into the position shown in Figure 8 and the projection 10'' of the cradle engages one of the projections 42 on the cam member. The cam is then moved in a counterclockwise direction into the position shown in Figure 8 so that the left-hand wall of the recess 44 on both sides of the cam member insure that the extensions 31 and 31' are both moved in the direction to trip its respective breaker. In this way, tripping of either of the breakers insures tripping of the other breaker. It is apparent that as many breakers as desired may be connected in side-by-side relation and that the tripping of all the breakers in response to tripping of any one is insured by the interposed cam members 40.

As previously described in connection with the modification of breaker shown in Figures 1–5, the breaker is reset by moving the handle to the right from the position shown in Figure 8 so that the extensions 22' of member 22 (see Figure 5) engage the cradle 10 to move it in a clockwise direction until the trip 14 engages the latching tip 13 on latch member 12.

Figure 10:
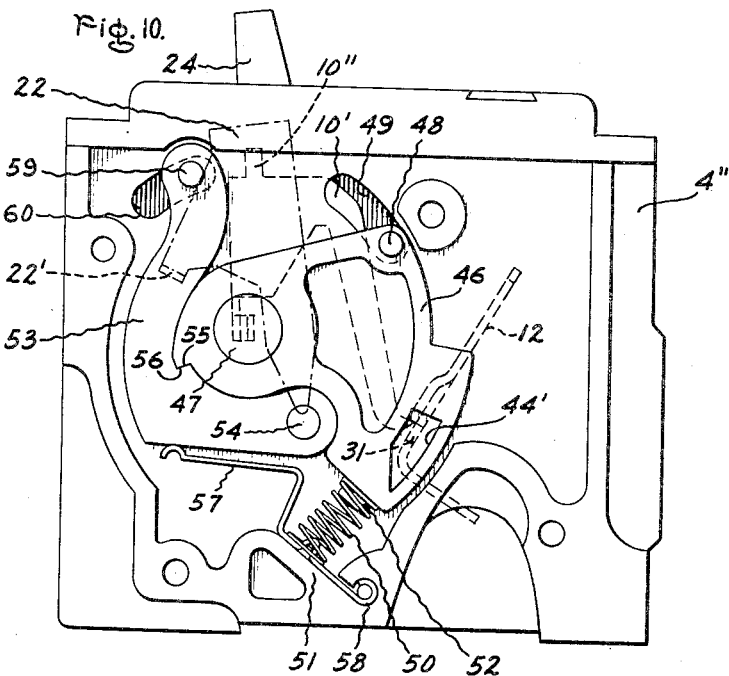
Figures 10 and 11 are elevational views of a circuit breaker illustrating a further modified form of interlocking arrangement embodying my invention with the breaker shown respectively in the closed and tripped positions.
Figure 11:
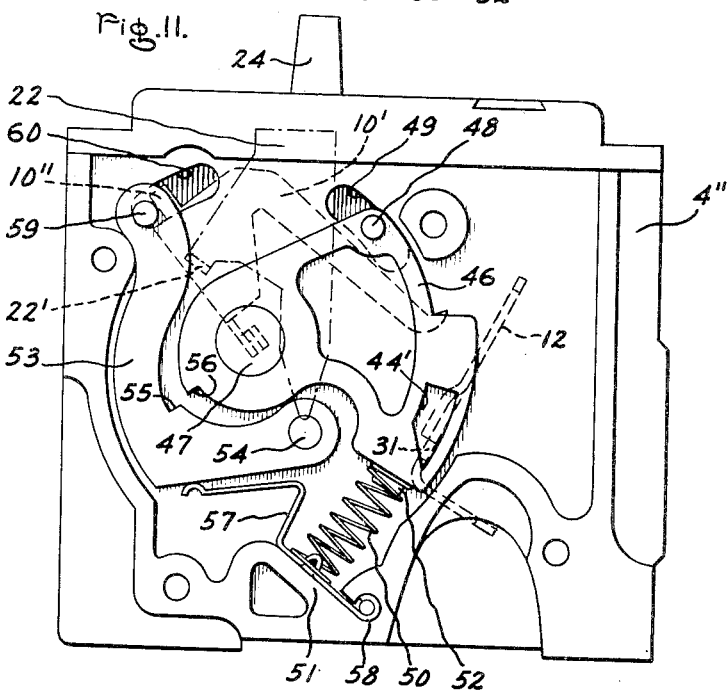

Figures 10 and 11 illustrate a modified form of my invention, in which additional spring power interposed between the separate poles of a multipole breaker is provided to actuate the tripping member. In this way the additional spring power interposed between the separate poles of a multipole breaker is provided to actuate the tripping member. In this way the additional load on the operating mechanism on any one breaker is minimized. Referring now to Figure 10, the interposed mechanism will be described in detail. The breaker is designated as breaker 4" and is shown in the closed position. The mechanism is the same as described in connection with Figures 6–9, inclusive. A tripping cam member 46 is pivoted on a hub 47 formed integrally with the breaker housing and is provided on opposite faces thereof with recesses 44' corresponding in shape and function to recesses 44 of the cam member 40 of the modification shown in Figures 6–9. The member 46, unlike the cam member 40, is provided with laterally extending projections 48 extending through openings 49 in the casings of the two breakers to be controlled by it. The cam member is biased in a counterclockwise direction by means of a coil spring 50 interposed between a molded shoulder 51 on the casing and a boss 52 on one end of the cam member 46.

The cam member 46 is restrained by a latch member 53 pivoted on an integral hub 54 and provided with a shoulder 55 which cooperates with a corresponding latching shoulder 56 on the cam member 46. The latch 53 is biased into latching position by means of the leaf spring 57 having an end 58 received within a recess in the casing and as illustrated extending under one end of the coil spring 50. The free end of the pivoted latch member 53 is provided with oppositely extending lateral projections 59 which extend through openings 60 in the adjacent side walls of the casings of the interlocked breakers. As will be understood from the description of the modification shown in Figures 6–9, inclusive, these projections are in the path of the movement of projections 10" on the cradle member 10' when the breaker is tripped so that the latch member 53 is moved in a counterclockwise direction to the position shown in Figure 11 in response to tripping of either of the breakers. This releases the cam member 46 by disengaging surfaces 55 and 56 so that it moves in a counterclockwise direction under action of the coil spring 50 and the inner cam surface of the recesses 44' engages the projections 31 and 31' of the latch member 12 to insure that both latch members move to tripped position in response to tripping of either one of the breaker mechanisms in response to an overload.

As soon as the bimetallic element (part 17 in Figure 5) of the breaker causing the initial tripping has cooled sufficiently, it is possible to reset the breakers by moving the handles thereof to the right from the position shown in Figure 11 so that the forward edge of the handle supporting member 22 engages the projections 48 on the cam member 46 and the projections 22' engage the cradle member 10'.

From the foregoing detailed description of three embodiments of my invention, it is apparent that I provide an interlocking means for operating all the poles of a multiple circuit breaker assembly comprising a plurality of individually enclosed circuit breaker units in response to overload tripping of any of the poles. The invention is characterized by its applicability to assemblies of standard single pole breakers, each one of which is complete in itself. The interlocking means moreover is provided by my invention with enclosing and protecting means housing it separately from the individual circuit breakers. In one modification the interlocking means is provided with separate spring power so that the loading of the mechanism of the first breaker to trip is minimized. While the invention, as has been shown, is applied to a circuit breaker having an operating mechanism of a particular type it will be appreciated that it may be applied to any similar circuit breaker having a part which moves through a path in response to tripping which is not transversed during manual operation of the breaker so that a part of the interlocking mechanism may project into that path.

What I claim as new and desire to secure by Letters Patent of the United States is:

1. A pair of electric circuit breakers each including an enclosing casing of insulating material secured together in side-by-side relation with a space between adjacent side walls of said casings, each of said breakers including a contact operating mechanism within the casing, said mechanism comprising a member normally biased to contact opening position, latch means normally restraining said member and operable in response to a condition of the circuit controlled by the breaker to release said member, an interlocking member interposed in the space between adjacent side walls of said casings and supported for rotation, said interlocking member having a portion extending into each of said casings and engageable by said first-mentioned member when released by said latch means to effect rotation of said interlocking member, said interlocking member having a second portion engageable with the latch means of each of said breakers whereby movement of said first-mentioned member of one of said breakers to contact opening position effects operation of the latch means of the other of said breakers.

2. A pair of electric circuit breakers each including an enclosing casing of insulating material secured together in side-by-side relation with a space between adjacent side walls of said casings, each of said breakers including a contact operating mechanism within the casing, said mechanism comprising a member normally biased to contact opening position, latch means normally restraining said member and operable in response to a condition of the circuit controlled by the breaker to release said member, an integral lateral extension on each of said latch means and extending through the adjacent side walls into said space; and an interlocking member movably supported between adjacent side walls of said cases, said interlocking member having a portion extending into each of said casings and engageable by said member when released by said latch means to effect rotation of said interlocking member, said interlocking member having surfaces engageable with the lateral extensions on said latch means whereby movement of said member of one of said breakers to contact opening position effects operation of the latch means of the other of said breakers.

3. A pair of electric circuit breakers each including an enclosing casing of insulating material secured together in side-by-side relation, each of said breakers including a contact operating mechanism within the casing, said mechanism comprising a pivotally mounted member normally biased to contact opening position, latch means normally restraining said member and operable in response to a condition of the circuit controlled by the breaker to release said member, a cam interposed between said breakers and pivotally mounted on an axis parallel to the axis of the mounting of said member, said cam having lateral projections extending into each of said casings and engageable by said member when said member is released by said latch means and movable by said member to effect rotation of said cam, said cam having surfaces engageable with the latch means of each of said breakers respectively and operable upon movement of said pivotally mounted member of one of said breakers to contact opening position to effect operation of the latch means of the other of said breakers to trip said other breaker.

4. A pair of electric circuit breakers each including an enclosing casing of insulating material secured together in side-by-side relation with a space between adjacent side walls of said casings, each of said breakers including a contact operating mechanism within the casing, said mechanism comprising a member normally biased to contact opening position, latch means normally restraining said member and operable in response to a condition of the circuit controlled by the breaker to release said member, an interlocking member interposed between adjacent side walls of said casings and supported for rotation, said interlocking member and said member of each of said breakers having interengaging portions operable to effect rotation of said interlocking member in response to movement of either one of said members, said interlocking member having a second portion engageable with the latch means of each of said breakers whereby movement of said member of one of said breakers to contact opening position effects operation of the latch means of the other of said breakers.

5. A pair of electric circuit breakers mounted in side-by-side relation and each including an operating mechanism including a member normally biased to contact opening position and latch means normally restraining said member and operable in response to an electrical condition to be controlled by said breaker to release said member; said latch means of said pair of circuit breakers having lateral extensions projecting toward one another at the adjacent sides of said circuit breakers, a cam member mounted for pivotal movement between said mechanisms and recessed from the opposite faces thereof to receive said lateral extensions, and means on said cam member extending into the path of movement of said first-mentioned member of each of said mechanisms and movable by said member when said member is released by the associated latch means to move said cam member and to cause said cam member to operate the latch means of the other of said mechanisms to trip said other mechanism.

6. A pair of electric circuit breakers mounted in side-by-side relation and each including an operating mechanism including a member normally biased to contact opening position, latch means normally restraining said member and operable in response to an electrical condition to be controlled by the breaker to release said member; an interlocking cam member mounted for pivotal movement between said mechanisms including surfaces engaging the latch means of each of said mechanisms, spring means biasing said cam member in a direction to move the latch means of each of said mechanisms to tripped position, a latching member pivoted between said mechanisms, and normally restraining said cam member, said last mentioned latch member including means projecting into the path of movement of said first-mentioned member of each of said mechanisms and movable upon tripping of either of said mechanisms by operation of the latch means associated therewith to release said cam member and thereby effect tripping of the other of said mechanisms.

7. A pair of electric circuit breakers each including an enclosing casing of insulating material secured in side-by-side relation with a space between adjacent side walls of said casings, each of said breakers including a contact operating mechanism mounted within the casing and including a member normally biased to contact opening position and latch means normally restraining said member and operable in response to a condition of the circuit controlled by the breaker to release said member; and an interlocking member interposed between adjacent side walls of said casings and supported for rotation, said interlocking member having cam surfaces cooperating with each of said latch means to move said latch means and release said first-mentioned member upon rotation in a given direction, spring means biasing said interlocking member in said given direction and a latch member pivoted between said casings normally restraining said interlocking member from movement by the action of said spring means, said latch member including transverse projections extending into each of said casings and into the path of movement of said first-mentioned member upon release by said latch means to move said latch member and release said interlocking member upon tripping of either of said mechanisms whereby said interlocking member is moved by said spring means to insure movement of both of said latch means in a direction to trip the associated mechanism in response to tripping of either one of said latch means and means on said interlocking member extending into each of said casings into the path of movement of a member of each of said mechanisms during resetting of said mechanisms to reset said interlocking member and said latch member.

8. A pair of electric circuit breakers each including an enclosing casing of insulating material secured together in side-by-side relation with a space between adjacent side walls of said casings, each of said breakers including a contact operating mechanism within the casing, said mechanism comprising a member normally biased to contact opening position, latch means normally restraining said member and operable in response to a condition of the circuit controlled by the breaker to release said member, interlocking means interposed in the space between adjacent said walls of said casings and supported for rotation, said interlocking means having a portion extending into each of said casings and engageable by said first-mentioned member when released by said latch means to effect rotation of said portion, said interlocking means having a second portion engageable with the latch means of each of said breakers whereby movement of said first-mentioned member of one of said breakers to contact opening position effects operation of the latch means of the other of said breakers.

9. A circuit breaker assembly as set forth in claim 8, the said assembly including means for substantially closing the space between the adjacent side walls of the individual circuit breakers along the periphery of said adjacent side walls.

10. A circuit breaker assembly comprising a pair of electric circuit breakers each having a generally rectangular insulating casing, one side wall of said casing being provided with an upstanding peripheral abutment thereon providing an open shallow recess on said circuit breaker casing side, means connecting said circuit breaker casings together with said upstanding peripheral abutments in abutting relation whereby a substantially completely enclosed chamber is provided intermediate said insulating casings, interlocking mechanism in said intermediate chamber and means connecting said interlocking mechanism with each of said operating mechanisms, said connecting means extending through the said adjacent side walls of said circuit breaker casings for causing the operation of one of said circuit breakers upon the operation of the other.

11. A circuit breaker assembly comprising a pair of electric circuit breakers each having a generally rectangular insulating casing, each of said circuit breakers comprising at least two relatively movable contacts and a member releasable to cause automatic opening of said contacts, means attaching said circuit breaker casings together in side-by-side relation, at least one of said adjacent sides having an upstanding peripheral abutment thereon extending outwardly and into engagement with portions of the other of said adjacent sides to form a chamber intermediate said breakers, trip interlocking mechanism within said intermediate chamber, said interlocking mechanism comprising a member pivoted on an axis transverse to said adjacent walls and having first and second angularly diverging portions, the said first portion being adapted to receive motion from said releasable member of said circuit breakers, said second portion being adapted to impart motion to said latch members of said circuit breakers in a tripping direction upon movement of said first portion.

References Cited in the file of this patent

UNITED STATES PATENTS

| | | |
|---|---|---|
| 1,261,677 | Atwood | Apr. 2, 1918 |
| 1,306,347 | Krantz | June 10, 1919 |
| 1,660,400 | Stevens | Feb. 28, 1928 |
| 1,953,812 | Lincks et al. | Apr. 3, 1934 |
| 2,627,563 | Thomas | Feb. 3, 1953 |